United States Patent

Mori

(10) Patent No.: US 10,289,232 B2
(45) Date of Patent: May 14, 2019

(54) PRESS DETECTING DEVICE

(71) Applicant: Murata Manufacturing Co., Ltd., Nagaokakyo-shi, Kyoto-fu (JP)

(72) Inventor: Kenichi Mori, Nagaokakyo (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 206 days.

(21) Appl. No.: 15/602,382

(22) Filed: May 23, 2017

(65) Prior Publication Data

US 2017/0262113 A1    Sep. 14, 2017

Related U.S. Application Data

(63) Continuation of application No. PCT/JP2015/084489, filed on Dec. 9, 2015.

(30) Foreign Application Priority Data

Dec. 17, 2014  (JP) ................................. 2014-255520

(51) Int. Cl.
  *G06F 3/041*  (2006.01)
  *G01L 1/16*   (2006.01)
  (Continued)

(52) U.S. Cl.
  CPC .............. *G06F 3/0414* (2013.01); *B32B 1/02* (2013.01); *B32B 7/12* (2013.01); *B32B 27/36* (2013.01);
  (Continued)

(58) Field of Classification Search
  CPC ...... G06F 3/041; G06F 3/0414; G06F 3/0488; B32B 7/12; B32B 27/36; G01L 1/16;
  (Continued)

(56) References Cited

U.S. PATENT DOCUMENTS 6,369,865 B2 * 4/2002 Hinata .................. G06F 3/0412
                                                349/12
6,793,762 B1 * 9/2004 Kondo ................ H01L 21/6836
                                                156/297

(Continued)

FOREIGN PATENT DOCUMENTS

| JP | H05-61592 A     | 3/1993 |
| JP | 2010-170515 A   | 8/2010 |
| WO | WO 2014/057593 A1 | 4/2014 |

OTHER PUBLICATIONS

International Search Report issued in International Patent Application No. PCT/JP2015/084489, dated Mar. 15, 2016.

(Continued)

*Primary Examiner* — Joe H Cheng
(74) *Attorney, Agent, or Firm* — Arent Fox LLP

(57) ABSTRACT

A touch input device that includes a housing; a touch detecting sensor having a piezoelectric film; a holding member; an interlayer pressure-sensitive adhesive that fixes the touch detecting sensor to the holding member; and a fixing adhesive that fixes the holding member to the housing. The interlayer pressure-sensitive adhesive has a large Young's modulus at lower temperatures and a small Young's modulus at higher temperatures. The fixing adhesive has a large Young's modulus at lower temperatures and a small Young's modulus at higher temperatures.

20 Claims, 10 Drawing Sheets

(51) Int. Cl.
*B32B 1/02* (2006.01)
*B32B 7/12* (2006.01)
*B32B 27/36* (2006.01)
*G06F 3/044* (2006.01)

(52) U.S. Cl.
CPC ............... *G01L 1/16* (2013.01); *G06F 3/044* (2013.01); *B32B 2307/20* (2013.01); *B32B 2457/208* (2013.01); *G06F 2203/04105* (2013.01)

(58) Field of Classification Search
CPC ..... G01L 7/08; G02F 1/13338; G02F 1/1339; H01J 3/242; H01L 29/84
See application file for complete search history.

(56) References Cited

U.S. PATENT DOCUMENTS

| | | | | |
|---|---|---|---|---|
| 7,264,873 | B2* | 9/2007 | Katoh | C08G 18/6229 428/355 AC |
| 8,278,151 | B2* | 10/2012 | Murata | B32B 7/12 438/113 |
| 9,946,388 | B2* | 4/2018 | Mori | G01L 1/16 |
| 10,120,486 | B2* | 11/2018 | Kano | G06F 3/0488 |
| 10,120,518 | B2* | 11/2018 | Ando | G06F 3/044 |
| 10,156,930 | B2* | 12/2018 | Kano | G06F 3/044 |
| 2003/0049415 | A1* | 3/2003 | Pedginski | B32B 27/08 428/195.1 |
| 2004/0037016 | A1* | 2/2004 | Kaneko | G06F 3/016 361/1 |
| 2004/0038057 | A1* | 2/2004 | Katoh | C08G 18/6229 428/500 |
| 2005/0238853 | A1* | 10/2005 | Kim | G02F 1/1339 428/192 |
| 2007/0077418 | A1* | 4/2007 | Sakurai | B32B 27/08 428/343 |
| 2009/0027352 | A1 | 1/2009 | Abele | |
| 2010/0188354 | A1* | 7/2010 | Tamura | G02F 1/13338 345/173 |
| 2011/0159642 | A1* | 6/2011 | Murata | B32B 7/12 438/113 |
| 2011/0268929 | A1* | 11/2011 | Tran | B32B 7/12 428/189 |
| 2012/0070658 | A1* | 3/2012 | Ikishima | H01L 21/6836 428/354 |
| 2013/0108061 | A1* | 5/2013 | Ando | G06F 3/0433 381/55 |
| 2014/0104216 | A1 | 4/2014 | Adachi et al. | |
| 2017/0192550 | A1* | 7/2017 | Kano | G06F 3/041 |
| 2017/0218231 | A1* | 8/2017 | Suzuki | C09J 7/00 |

OTHER PUBLICATIONS

Written Opinion of the International Searching Authority issued in International Patent Application No. PCT/JP2015/084489, dated Mar. 15, 2016.

* cited by examiner

FIXING ADHESIVE

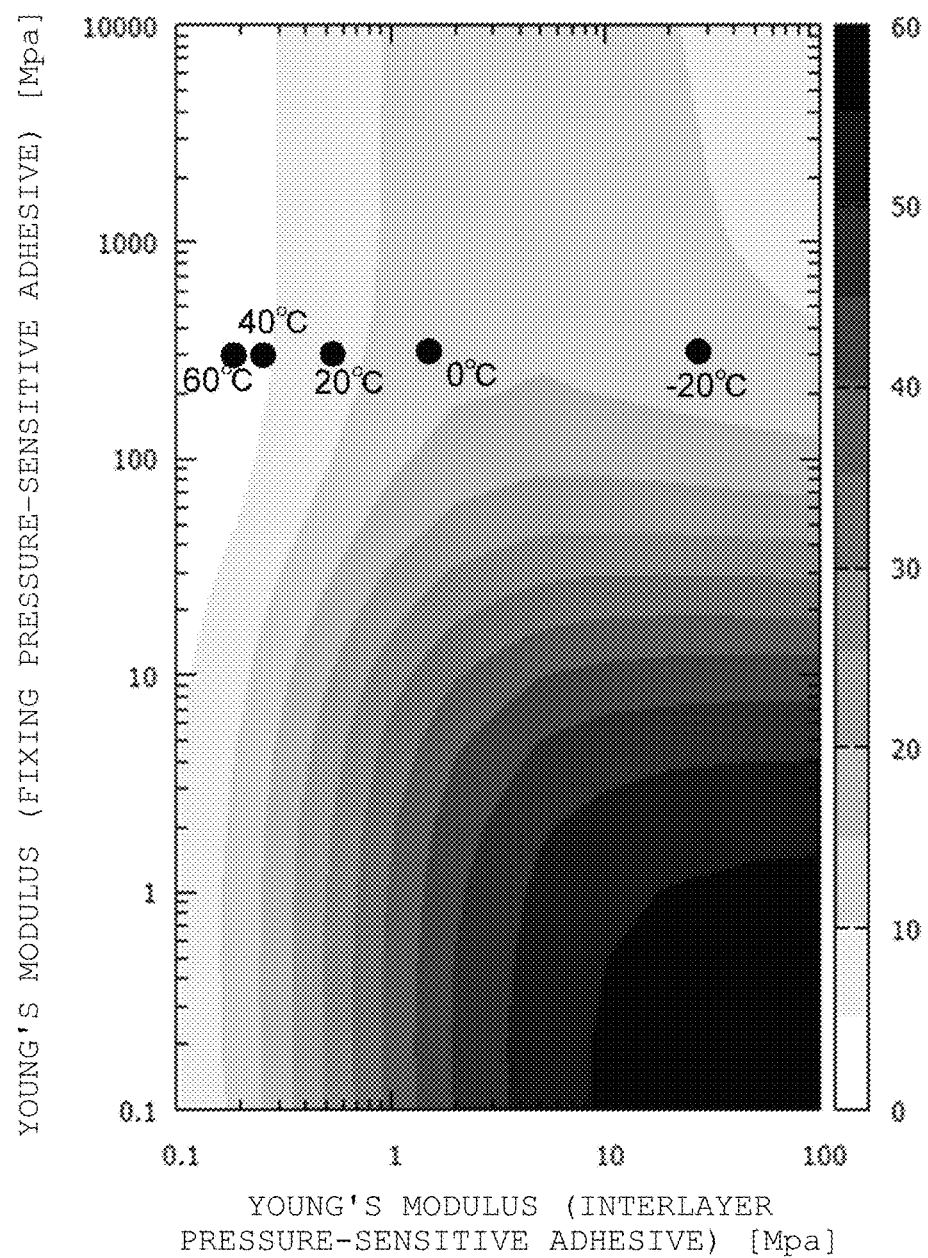
FIG. 12 - PRIOR ART

FIG. 13 - PRIOR ART
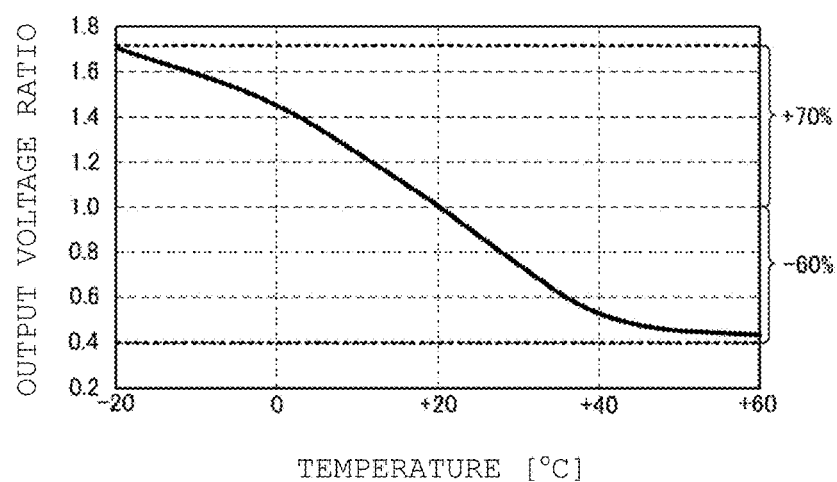

PRESS DETECTING DEVICE

CROSS REFERENCE TO RELATED APPLICATIONS

The present application is a continuation of International application No. PCT/JP2015/084489, filed Dec. 9, 2015, which claims priority to Japanese Patent Application No. 2014-255520, filed Dec. 17, 2014, the entire contents of each of which are incorporated herein by reference.

FIELD OF THE INVENTION

The present invention relates to a press detecting device that detects a press to an operation surface.

BACKGROUND OF THE INVENTION

There have currently been devised a variety of devices that detect a press to an operation surface by using a flat-film press sensor. For example, a touch input device described in Patent Document 1 includes a pressure sensitive sensor (press sensor) in a flat-film shape and a touch panel (pressing position detecting sensor) in a flat-film shape. The pressure sensitive sensor and the touch panel are laminated on a base plate in the order of the pressure sensitive sensor and the touch panel.

When the pressure sensitive sensor and the touch panel are to be laminated and disposed as above, a pressure-sensitive adhesive layer is typically interposed between the pressure sensitive sensor and the touch panel so as to prevent a change in positional relation between the pressure sensitive sensor and the touch panel.

Patent Document 1: Japanese Patent Application Laid-Open No. 5-61592

SUMMARY OF THE INVENTION

In the touch input device, when the pressure sensitive sensor and the touch panel have translucency, the pressure-sensitive adhesive layer interposed therebetween also needs to have translucency. A pressure-sensitive adhesive, being currently in general use and having translucency, has a large Young's modulus at low temperatures and a small Young's modulus at high temperatures.

Hence in the configuration formed only of the pressure sensitive sensor and the touch panel, distortion caused by a pressing force is easily transmitted to the pressure sensitive sensor at low temperatures, and the distortion is hardly transmitted to the pressure sensitive sensor at high temperatures. For this reason, when a pressing force is calculated using an output voltage of the pressure sensitive sensor as it is, a pressing force at high temperatures differs from a pressing force at low temperatures.

Further, such a touch input device is used while being fixed to a housing or the like. When the touch input device is to be fixed to the housing, a fixing adhesive having a Young's modulus that hardly changes in accordance with the temperature may be used.

FIG. 12 is a diagram showing a change in output voltage based on the relation between Young's modulus of an interlayer pressure-sensitive adhesive and Young's modulus of the fixing adhesive. The depth of color in the figure shows an output voltage. The interlayer pressure-sensitive adhesive is a pressure-sensitive adhesive that adheres the pressure sensitive sensor and the touch panel. The fixing adhesive is a pressure-sensitive adhesive that fixes the touch input device to the housing.

As shown in black circles in FIG. 12, the Young's modulus of the fixing adhesive remains unchanged even with a change in temperature. As shown in FIG. 12, background colors of the black circles shows that the output voltage changes in accordance with the change in temperature.

FIG. 13 is a graph showing a temperature characteristic of the output voltage ratio of a pressure sensitive sensor corresponding to the press detecting device.

In FIG. 13, a horizontal axis indicates a temperature, and a vertical axis indicates an output voltage ratio at each temperature, with an output voltage at 20° C. taken as a reference value. As shown in FIG. 13, in the conventional structure, variations in temperature from +70% to −60% occur in a temperature segment of −20° C. to +60° C. Therefore, in the conventional configuration, the detected pressing force is influenced by the temperature.

It is an object of the present invention to provide a press detecting device where the detected press amount when the temperature changes.

A press detecting device in accordance with an aspect of the present invention includes a press sensor having a piezoelectric film; a holding member that has an operation surface and fixes the press sensor to a housing; an interlayer pressure-sensitive adhesive that fixes the press sensor to the holding member; and a fixing adhesive that fixes the holding member to the housing. The interlayer pressure-sensitive adhesive has a large Young's modulus at low temperatures and a small Young's modulus at high temperatures. The fixing adhesive has a large Young's modulus at low temperatures and a small Young's modulus at high temperatures.

In this configuration, a change in distortion of the holding member, made based on a change in Young's modulus of the interlayer pressure-sensitive adhesive with respect to temperature and transmitted to the piezoelectric film, is suppressed by a change in the Young's modulus of the fixing adhesive with respect to temperature. Accordingly, a change in amount of electric charge, generated by the piezoelectric film based on the change in Young's modulus of the interlayer pressure-sensitive adhesive with respect to temperature, is suppressed by the change in the Young's modulus of the fixing adhesive with respect to temperature.

Further, the press detecting device in accordance with an aspect of the present invention is preferably configured such that the interlayer pressure-sensitive adhesive has a high rate of change in Young's modulus with respect to temperature at low temperatures, and a low rate of change in Young's modulus with respect to temperature at high temperatures. The fixing adhesive preferably has a low rate of change in Young's modulus with respect to temperature at low temperatures, and a high rate of change in Young's modulus with respect to temperature at high temperatures.

In this configuration, a change in amount of electric charge of the piezoelectric film due to a change in temperature of the interlayer pressure-sensitive adhesive at high temperatures is larger than a change in amount of electric charge of the piezoelectric film due to a change in temperature of the interlayer pressure-sensitive at low temperatures. Accordingly, distortion of the holding member increases by increasing the rate of change in Young's modulus with respect to temperature at high temperatures in the fixing adhesive, whereby it is possible to more accurately suppress the change in amount of electric charge of the piezoelectric film due to the change in temperature of the interlayer pressure-sensitive adhesive at high temperatures.

According to aspects of the present invention, it is possible to suppress changes in detected press amount due to changes in temperature. Thus, a pressing force can be stably detected without being influenced by the temperature.

BRIEF EXPLANATION OF THE DRAWINGS

FIG. 12 is a diagram showing a change in output voltage based on the relation between Young's modulus of an interlayer pressure-sensitive adhesive and Young's modulus of a fixing adhesive in a conventional configuration.

FIG. 13 is a graph showing a temperature characteristic of output characteristics of a pressure sensitive sensor corresponding to a press detecting device in the conventional configuration.

DETAILED DESCRIPTION OF PREFERRED EMBODIMENTS OF THE INVENTION

Figure 1:
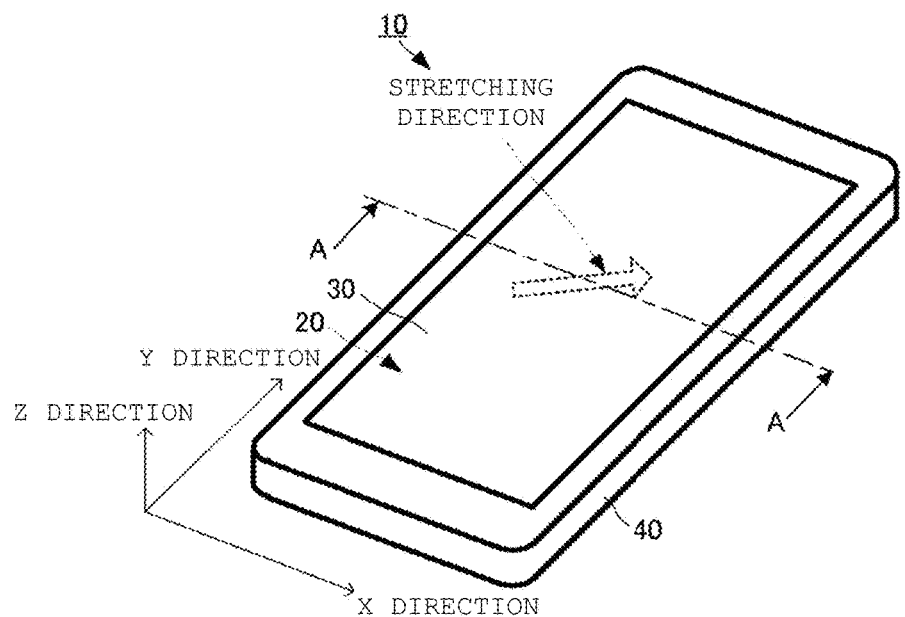
FIG. 1 is an external perspective view of a touch input device according to a first embodiment of the present invention.
Figure 2:
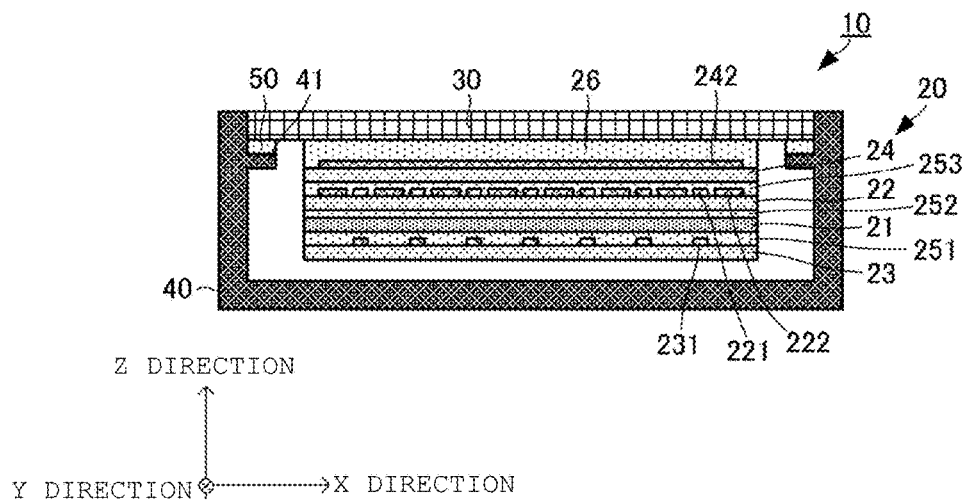
FIG. 2 is a sectional view of the touch input device according to the first embodiment of the present invention.

A touch input device provided with a press detecting device according to an embodiment of the present invention will be described with reference to the drawings. FIG. 1 is an external perspective view of the touch input device according to an embodiment of the present invention. FIG. 2 is a sectional view of the touch input device according to an embodiment of the present invention.

In one embodiment, the touch input device 10 includes a housing 40 having a nearly cuboid shape. The front surface end of the housing 40 is opened. Note that a description will be given in the following, taking a width direction (lateral direction) of the housing 40 as an X direction, a length direction (longitudinal direction) thereof as a Y direction, and a thickness direction thereof as a Z direction.

In the housing 40, a touch detecting sensor 20, a display panel (not shown), and an arithmetic operation circuit module (not shown) are disposed.

The front surface of the housing 40 is opened, and a holding member 30 is disposed in the opening. The holding member 30 is a flat plate having translucency. The holding member 30 is glass, for example. In the vicinity of the opening surface of the housing 40, a holding projection 41 is formed having the shape of projecting toward the inside of the opening. The outer circumferential edge of the holding member 30 is placed on the holding projection 41. The surface of the holding member 30 which abuts on the holding projection 41 is fixed to the holding projection 41 by a fixing adhesive 50. The front surface of the holding member 30 is an operation surface, namely the surface for accepting a press and a touch from a user.

The touch detecting sensor 20 is fixed to the rear surface of the holding member 30 by an interlayer pressure-sensitive adhesive 26.

The touch detecting sensor 20 includes a piezoelectric film 21, insulating films 22, 23, 24, press detecting conductors 221, 231, position detecting conductors 222, 242, and interlayer pressure-sensitive adhesives 251, 252, 253.

The piezoelectric film 21 is made of a piezoelectric material that generates electric charge in amount in accordance with a pressing force, and is a film formed of chiral polymer, for example. In the present embodiment, polylactic acid (PLA), particularly poly-L-lactic acid (PLLA), is used as chiral polymer. PLLA is uniaxially stretched. A uniaxially stretching direction of the piezoelectric film 21 forms an angle of nearly 45° with respect to each of the X direction and the Y direction of the touch input device 10.

A main chain of PLLA made of chiral polymer as above has a helical structure.

PLLA has piezoelectricity when PLLA is uniaxially stretched and molecules are oriented. By pressing of the flat film surface of the piezoelectric film, uniaxially stretched PLLA generates an electric charge. In this regard, an amount of electric charge to be generated is uniquely decided based on an amount of displacement of the flat plate surface displaced by a press in a direction orthogonal to the flat plate surface. A piezoelectric constant of uniaxially stretched PLLA belongs to a group of very high piezoelectric constants among polymers. Accordingly, displacement by a press can be detected with high sensitivity.

Note that a stretch ratio is preferably about three to eight times. Performing heat treatment after stretching encourages crystallization of extended chain crystal of polylactic acid, to improve the piezoelectric constant. In addition, in the case of biaxial stretching, it is possible to obtain a similar effect to that of uniaxial stretching by making stretch ratios of the respective axes different. For example, when a sheet is stretched eight times in a given direction as the X axis direction and is stretched two times in the Y axis direction orthogonal to the X axis, it is possible to obtain substantially the same effect of the piezoelectric constant as in a case where a sheet is uniaxially stretched four times in the X axis direction. Since a simply uniaxially stretched sheet is likely to be broken in a stretching axis direction, it is possible to increase the strength to some extent by biaxially stretching PLLA as described above.

Further, PLLA generates piezoelectricity as a result of molecule orientation processing by stretching or the like, and does not require polling processing unlike other polymers such as polyvinylidene fluoride (PVDF) or piezoelectric ceramics. That is, the piezoelectricity of PLLA not belonging to ferroelectrics is exhibited not by ion polarization as in ferroelectrics such as PVDF or lead zirconate titanate (PZT), but derives from a helical structure which is a characteristic structure of molecules. Hence, PLLA does not exhibit pyroelectricity that is generated by other ferroelectric piezoelectric bodies. Further, the piezoelectric constant of PVDF or the like temporally fluctuates and remarkably decreases depending on cases, but the piezoelectric constant of PLLA is temporally very stable. Thus, displacement by a press can be detected with high sensitivity without being influenced by a surrounding environment.

Since a relative permittivity of PLLA is approximately 2.5 and very low, when d is a piezoelectric constant and $\varepsilon^t$ is a dielectric constant, a piezoelectric output constant (=piezoelectric g constant where $g=d/\varepsilon^t$ holds) takes a high value. In this regard, the piezoelectric g constant of PVDF having dielectric constant $\varepsilon_{33}^T=13\times\varepsilon_0$ and a piezoelectric constant $d_{31}=25$ pC/N is $g_{31}=0.2172$ Vm/N according to the above equation. Meanwhile, when the piezoelectric g constant of PLLA having a piezoelectric constant $d_{14}=10$ pC/N is converted into $g_{31}$ and calculated, $d_{14}=2\times d_{31}$ holds, and hence $d_{31}=5$ pC/N holds and the piezoelectric g constant takes $g_{31}=0.2258$ Vm/N. It is thus possible to sufficiently obtain a similar detection sensitivity to a push amount to that of PVDF by using PLLA having the piezoelectric constant $d_{14}=10$ pC/N. The inventors of the present invention have experimentally obtained PLLA with the piezoelectric constant $d_{14}=15$ to 20 pC/N, and the use of this PLLA allows detection of a press with even higher sensitivity.

The insulating film 22 is disposed on the holding member 30 end of the piezoelectric film 21. The press detecting conductor 221 and the position detecting conductor 222 are disposed on the front surface of the insulating film 22. A plurality of press detecting conductors 221 and position detecting conductors 222 are arranged. The press detecting conductor 221 and the position detecting conductor 222 are in shapes extending along the Y direction, and arranged with intervals along the X direction.

The insulating film 22 is fixed to the piezoelectric film 21 by the interlayer pressure-sensitive adhesive 252.

The insulating film 23 is disposed on the end of the piezoelectric film 21 which is opposite from the insulating film 22. The press detecting conductor 231 is disposed on the front surface of the insulating film 23. A plurality of press detecting conductors 231 are arranged. The press detecting conductor 231 is in a shape extending along the Y direction, and arranged with intervals along the X direction. The press detecting conductor 231 faces the press detecting conductor 221 with the piezoelectric film 21 interposed therebetween.

The insulating film 23 is fixed to the piezoelectric film 21 by the interlayer pressure-sensitive adhesive 251.

The insulating film 24 is disposed on the holding member 30 end of the insulating film 22. The position detecting conductor 242 is disposed on the front surface of the insulating film 24. A plurality of position detecting conductors 242 are arranged. The position detecting conductors 242 each have a shape extending along the X direction, and are arranged with intervals along the Y direction. The position detecting conductor 242 and the position detecting conductor 222 partially overlap each other with the insulating film 24 interposed therebetween.

The rear surface of the insulating film 24 is fixed to the insulating film 22 by the interlayer pressure-sensitive adhesive 253. The front surface of the insulating film 24 is fixed to the rear surface of the holding member 30 by the interlayer pressure-sensitive adhesive 26.

In the present embodiment, the position detecting conductor 242 has been formed in the shape of extending in the X direction and the position detecting conductor 222 and the press detecting conductors 221, 231 have been formed in the shapes of extending in the Y direction, but on the contrary, the position detecting conductor 242 may be formed in the shape of extending in the Y direction and the position detecting conductor 222 and the press detecting conductors 221, 231 may be formed in the shapes of extending in the X direction.

Although the mode of the touch input device 10 for detecting a pressing force and a pressing position has been shown in the present embodiment, it may be a press detecting device for detecting a pressing force. In this case, so long as members needed for detecting a pressing position are provided in the foregoing mode, the insulating film 24, the position detecting conductors 222, 242, and the interlayer pressure-sensitive adhesive 253 are omitted.

With this configuration, the interlayer pressure-sensitive adhesives 251, 252, 253, 26 and the fixing adhesive 50 have the following physical properties.

Figure 3:
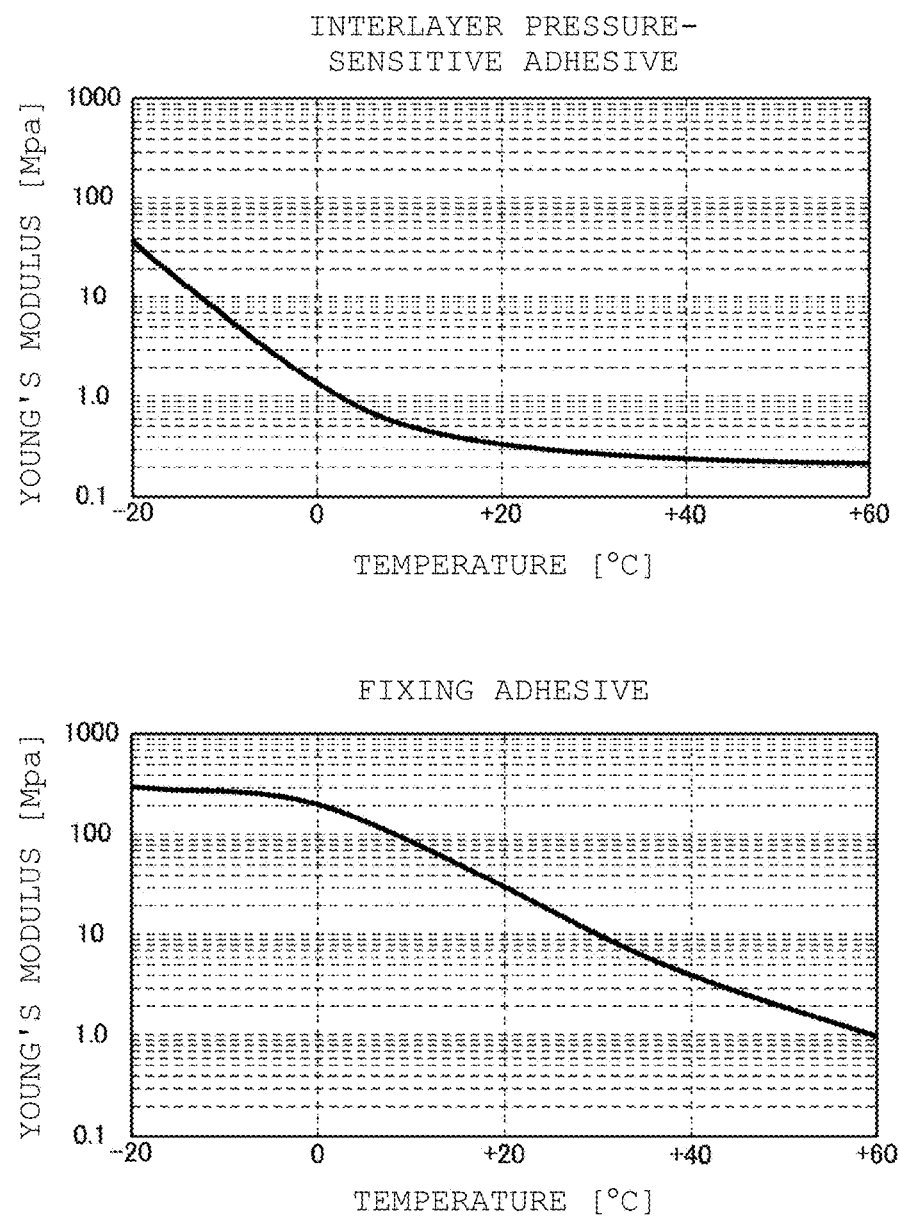
FIG. 3 is a graph showing temperature characteristics of Young's modulus of an interlayer pressure-sensitive adhesive and a fixing adhesive in the touch input device according to the first embodiment of the present invention.

FIG. 3 is a graph showing temperature characteristics of Young's modulus of the interlayer pressure-sensitive adhesive and the fixing adhesive in the touch input device according to the first embodiment of the present invention.

As shown in FIG. 3, Young's modulus of each of the interlayer pressure-sensitive adhesives 251, 252, 253, 26 is high at low temperature and low at high temperature. In the interlayer pressure-sensitive adhesives 251, 252, 253, 26, a rate of change in Young's modulus with respect to temperature is large in a temperature range of not higher than +20° C., and is even larger in a temperature range of not higher than 0° C. In the interlayer pressure-sensitive adhesives 251, 252, 253, 26, the rate of change in Young's modulus with respect to temperature is small in a temperature range of not lower than +20° C., and is even smaller in a temperature range of not lower than +40° C.

The fixing adhesive 50 has large Young's modulus at low temperature and small Young's modulus at high temperature. The fixing adhesive 50 has a low rate of change in Young's modulus with respect to temperature in the temperature range of not higher than 0° C. The fixing adhesive 50 has a high rate of change in Young's modulus with respect to temperature in the temperature range of not lower than 0° C.

Note that a low-temperature range in this regard is roughly a range of temperatures lower than 0° C. to 10° C., and a high-temperature range is roughly a range of temperatures higher than 0° C. and to 10° C.

Figure 4:
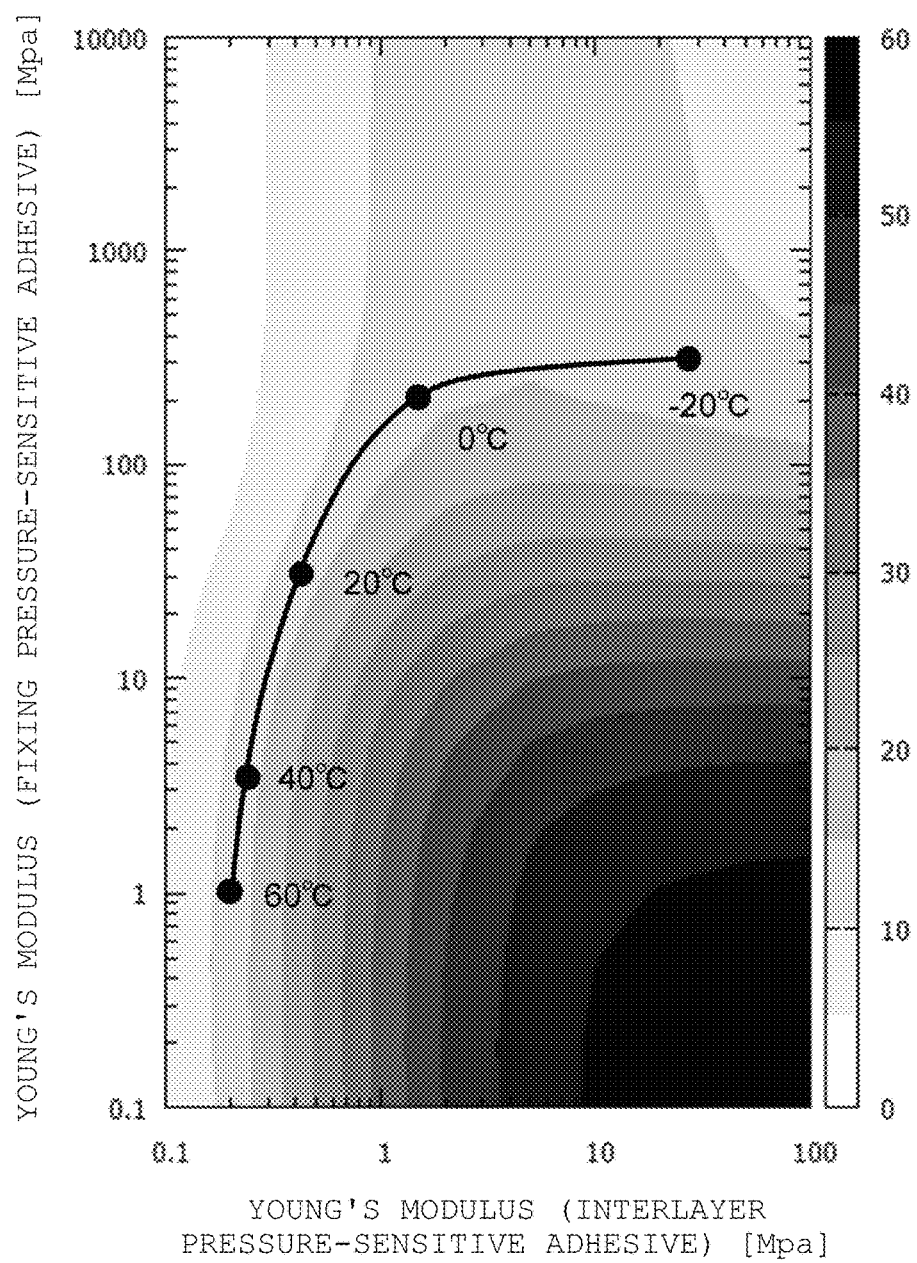
FIG. 4 is a diagram showing a change in output voltage based on the relation between the Young's modulus of the interlayer pressure-sensitive adhesive and the Young's modulus of the fixing adhesive in the touch input device according to the first embodiment of the present invention.

FIG. 4 is a diagram showing a change in output voltage based on the relation between the Young's modulus of the interlayer pressure-sensitive adhesive and the Young's modulus of the fixing adhesive in the touch input device according to the first embodiment of the present invention. The depth of color in the figure shows an output voltage. As shown in FIG. 4, by using the configuration of the present embodiment, background colors of black circles showing output at the respective temperatures become the same. Since the Young's modulus of the fixing adhesive is large at low temperatures, the glass hardly deforms and distortion of the glass is small as compared with that at high temperatures. Further, since the Young's modulus of the interlayer pressure-sensitive adhesive is also large at low temperatures, the distortion of the glass is not reduced and output does not greatly decrease. Meanwhile, since the Young's modulus of the fixing adhesive is small at high temperatures, the glass easily deforms and distortion of the glass is larger than at low temperatures. Further, since the Young's modulus of the interlayer pressure-sensitive adhesive is also small at high temperatures, the distortion of the glass is reduced and output decreases. That is, the magnitude of distortion of the glass and the magnitude of reduction in that distortion are in the relation of being contrary to each other between the time of low temperature and the time of high temperature, and a black line in the figure passes through a part with the same background color. Namely, an output voltage at each temperature is constant without being influenced by the temperature.

Figure 5:
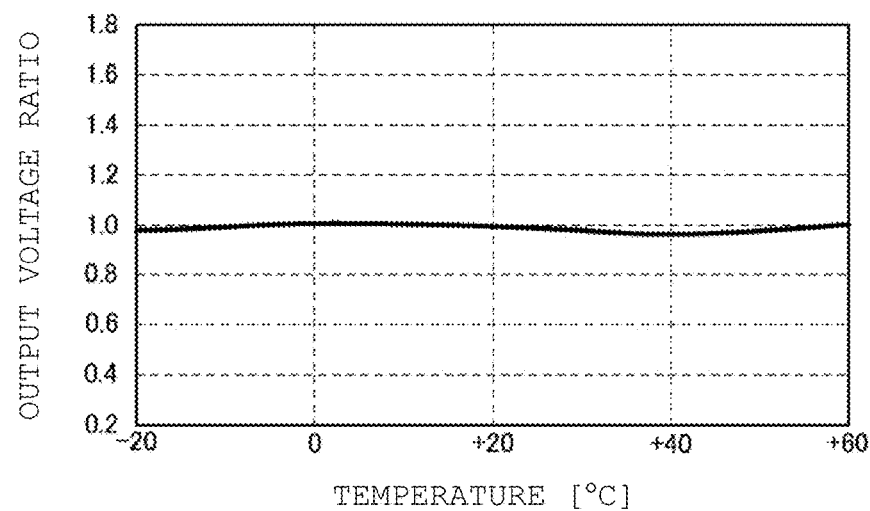
FIG. 5 shows a temperature characteristic at an output voltage ratio in the touch input device according to the first embodiment of the present invention.

FIG. 5 shows a temperature characteristic of an output voltage ratio in the touch input device according to the first embodiment of the present invention. A vertical axis of FIG. 5 indicates an output voltage ratio with an output voltage at 20° C. taken as a reference value. As shown in FIG. 5, using the configuration of the present embodiment can reduce a change in output voltage in accordance with the temperature. An output voltage can thus be stably detected in accordance with a pressing force without being influenced by the temperature. Accordingly, the output voltage can be accurately detected in accordance with a pressing force without being influenced by the temperature.

Note that not all of the foregoing interlayer pressure-sensitive adhesives 252, 253, 26 need to be the pressure-sensitive adhesives, but at least one may be the pressure-sensitive adhesive while the others may be the same as the fixing adhesive.

In the foregoing description, the mode has been shown where the rear surface of the holding member 30 is stuck to the front surface of the holding projection 41 by the fixing adhesive 50. However, there may be used a mode where the side surface of the holding member 30 is stuck to the inner wall of the housing 40 by the fixing adhesive 50. There may also be used a mode where the bottom surface of the holding member 30 is stuck to the holding projection 41 by the fixing adhesive 50, and the side surface of the holding member 30 is stuck to the inner wall of the housing 40 by the fixing adhesive 50. In this regard, the fixing adhesive 50 is preferably formed in the shape of covering from the side surface to the bottom surface of the holding member 30.

Next, a touch input device according to a second embodiment of the present invention will be described with reference to the drawings. The touch input device according to the present embodiment differs from the touch input device 10 according to the first embodiment in the characteristic of the fixing adhesive. The other configurations are the same as those of the touch input device 10 according to the first embodiment.

Figure 6:
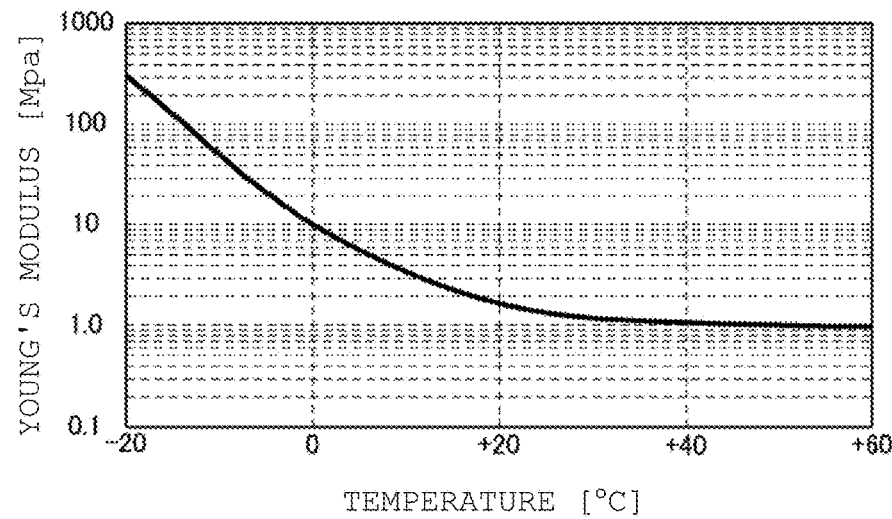
FIG. 6 is a graph showing temperature characteristics of Young's modulus of a fixing adhesive in a touch input device according to a second embodiment of the present invention.

FIG. 6 is a graph showing a temperature characteristic of Young's modulus of a fixing adhesive in the touch input device according to the second embodiment of the present invention. As shown in FIG. 6, the fixing adhesive of the touch input device according to the present embodiment has large Young's modulus at low temperatures and small Young's modulus at high temperatures. More specifically, the fixing adhesive of the touch input device according to the second embodiment has the same temperature characteristic of Young's modulus as that of the interlayer pressure-sensitive adhesive shown in FIG. 3.

Figure 7:
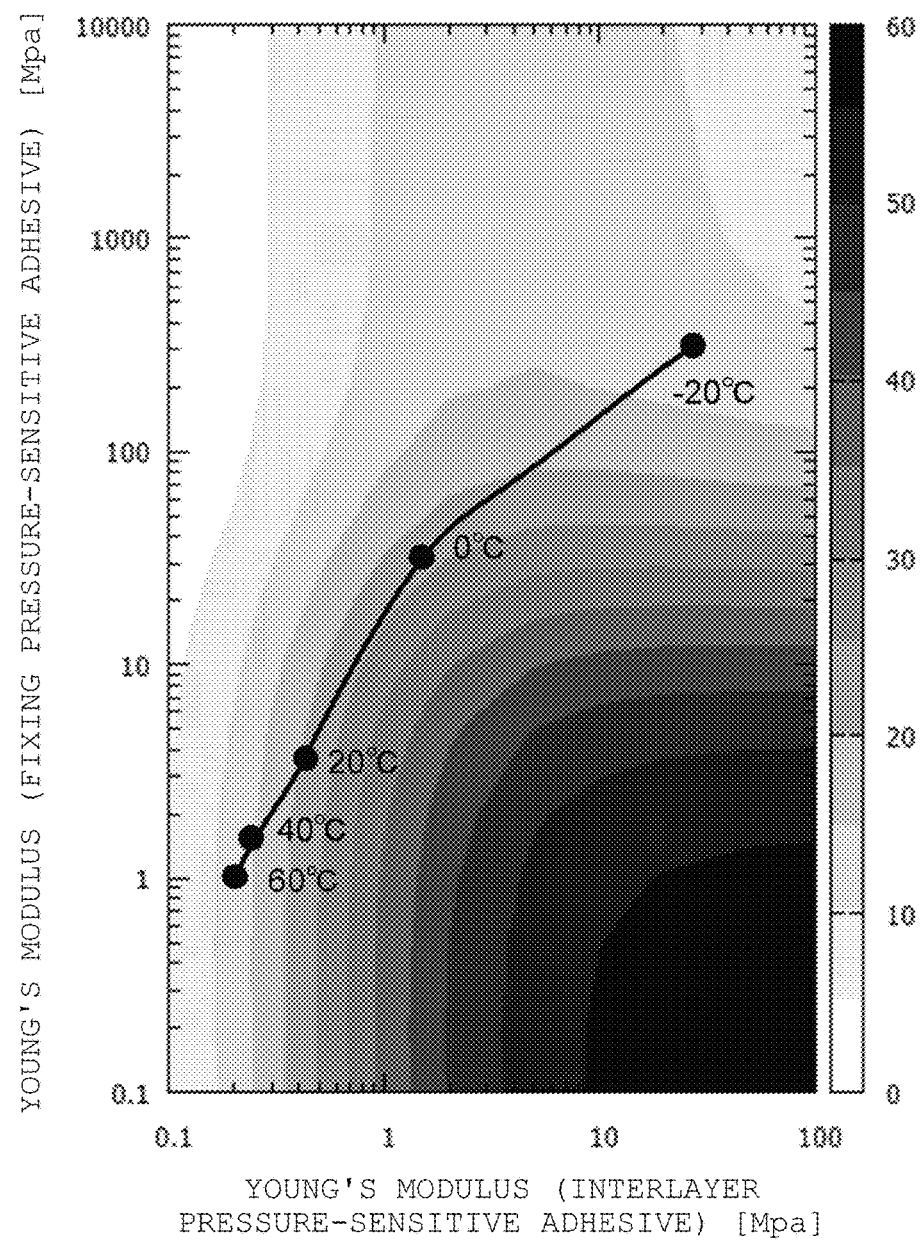
FIG. 7 is a diagram showing a change in output voltage based on the relation between the Young's modulus of an interlayer pressure-sensitive adhesive and the Young's modulus of the fixing adhesive in the touch input device according to the second embodiment of the present invention.

FIG. 7 is a diagram showing a change in output voltage based on the relation between the Young's modulus of the interlayer pressure-sensitive adhesive and the Young's modulus of the fixing adhesive in the touch input device according to the second embodiment of the present invention. The depth of color in the figure shows an output voltage. As shown in FIG. 7, by using the configuration of the second embodiment, background colors of black circles showing output at the respective temperatures are slightly different, but almost the same. That is, although the output voltage at each temperature is influenced by the temperature, the influence can be controlled to be in a small range.

Figure 8:
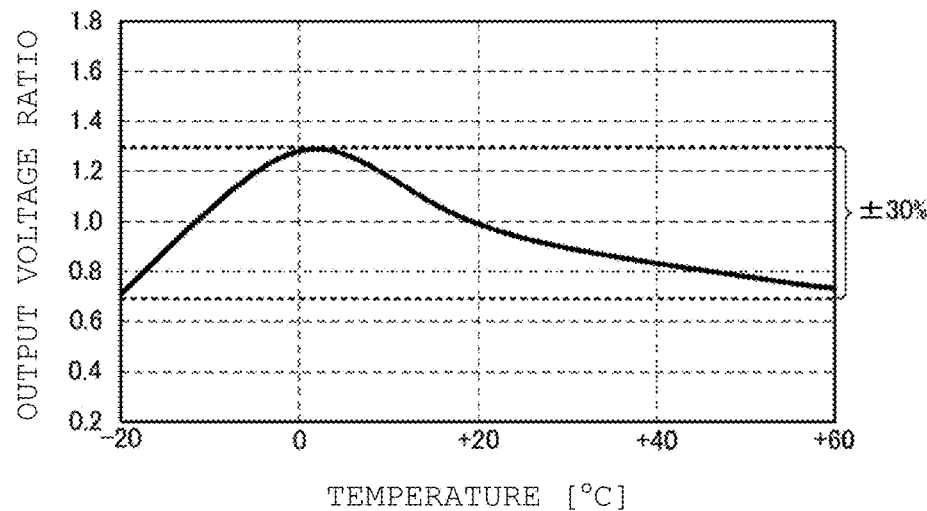
FIG. 8 shows a temperature characteristic at an output voltage ratio in the touch input device according to the second embodiment of the present invention.

FIG. 8 shows a temperature characteristic at an output voltage ratio in the touch input device according to the second embodiment of the present invention. A vertical axis of FIG. 8 indicates an output voltage ratio with an output voltage at 20° C. taken as a reference value. As shown in FIG. 8, using the configuration of the second embodiment can suppress a change in output voltage in accordance with the temperature more than in the conventional configuration. Accordingly, a pressing force can be detected more stably than in the conventional configuration within a predetermined error range, although still being somewhat influenced by the temperature. For example, in the configuration of the second embodiment, a pressing force can be detected within an error range of ±30%.

Next, a touch input device according to a third embodiment of the present invention will be described with reference to the drawings. The touch input device according to the present embodiment differs from the touch input device 10 according to the first embodiment in the characteristic of the fixing adhesive. The other configurations are the same as those of the touch input device 10 according to the first embodiment.

Figure 9:
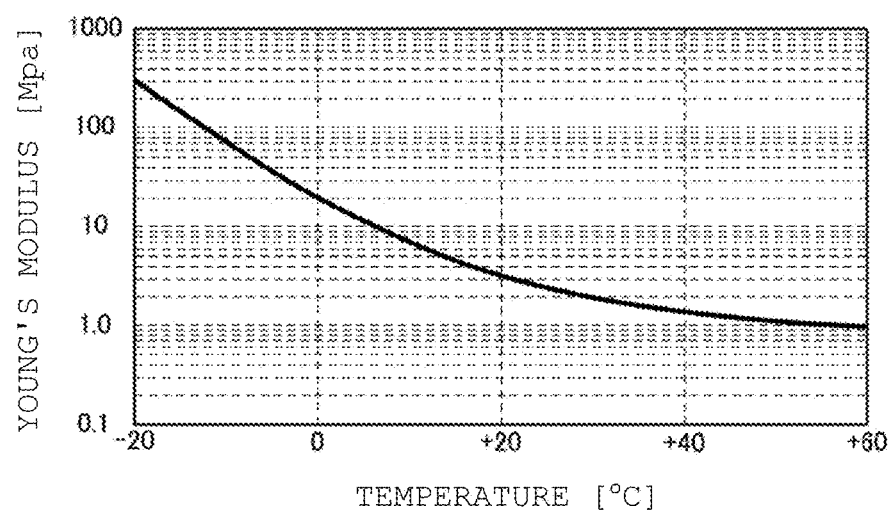
FIG. 9 is a graph showing temperature characteristics of Young's modulus of a fixing adhesive in a touch input device according to a third embodiment of the present invention.

FIG. 9 is a graph showing a temperature characteristic of Young's modulus of the fixing adhesive in the touch input device according to the third embodiment of the present invention. As shown in FIG. 9, the fixing adhesive of the touch input device according to the present embodiment has large Young's modulus at low temperatures and small Young's modulus at high temperatures. More specifically, the fixing adhesive of the touch input device according to the present embodiment has a similar temperature characteristic of Young's modulus to that of the interlayer pressure-sensitive adhesive shown in FIG. 3.

Figure 10:
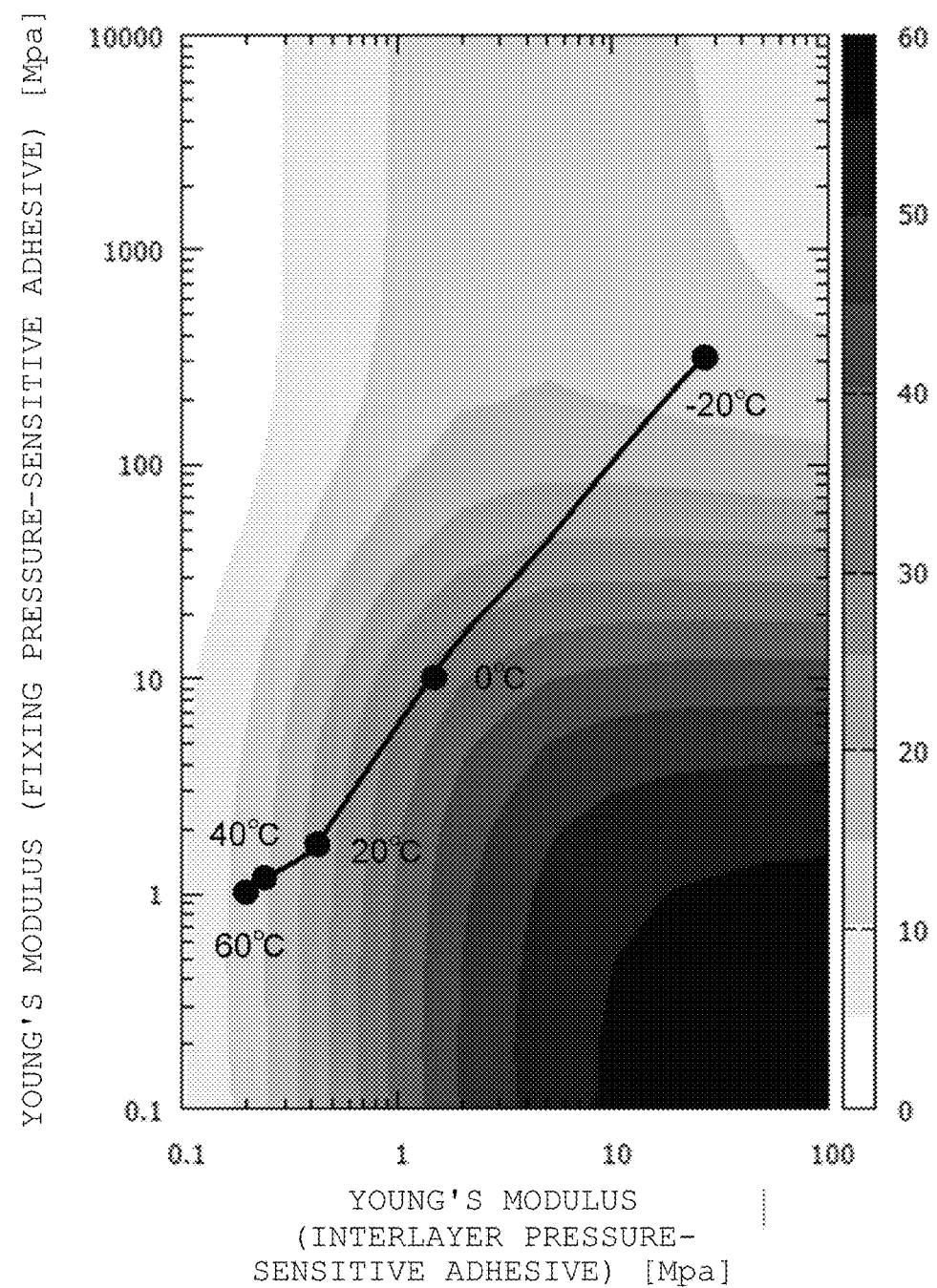
FIG. 10 is a diagram showing a change in output voltage based on the relation between the Young's modulus of the interlayer pressure-sensitive adhesive and the Young's modulus of the fixing adhesive in the touch input device according to the third embodiment of the present invention.

FIG. 10 is a diagram showing a change in output voltage based on the relation between the Young's modulus of the interlayer pressure-sensitive adhesive and the Young's modulus of the fixing adhesive in the touch input device according to the third embodiment of the present invention. The depth of color in the figure shows an output voltage. As shown in FIG. 10, by using the configuration of the third embodiment, background colors of black circles showing output at the respective temperatures are different to some extent, but vary less than in the conventional configuration. That is, although the output voltage at each temperature is influenced by the temperature, the influence can be controlled within a smaller range than in the conventional configuration.

Figure 11:
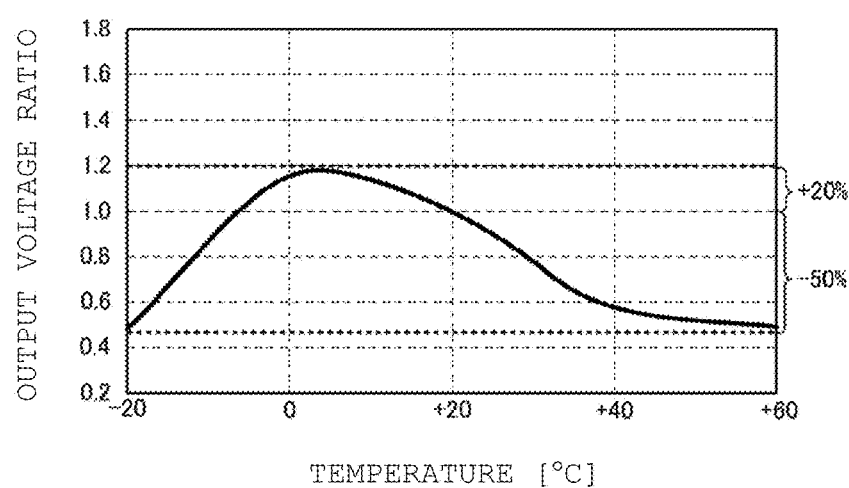
FIG. 11 shows a temperature characteristic at an output voltage ratio in the touch input device according to the third embodiment of the present invention.

FIG. 11 shows a temperature characteristic at an output voltage ratio in the touch input device according to the third embodiment of the present invention. A vertical axis of FIG. 11 indicates an output voltage ratio with an output voltage at 20° C. taken as a reference value. As shown in FIG. 11, using the configuration of the third embodiment can suppress a change in output voltage in accordance with the temperature more than in the conventional configuration.

Accordingly, a pressing force can be detected more stably than in the conventional configuration within a predetermined error range, although being influenced by the temperature. For example, in the configuration of the present embodiment, a pressing force can be detected within an error range of +20% to −50%.

In each of the second and third embodiments, although the influence has been exerted by the temperature, that influence is smaller than that in the conventional configuration. In the conventional configuration, an output voltage at 60° C. decreases by as much as 60% from an output voltage at 20° C. For detecting the output voltage at 60° C. as a pressing force, a threshold of the output voltage at which the user can be regarded as having pressed the touch input device needs to be lowered to a large extent. When the threshold is lowered to a large extent, noise generated in the press detecting conductor is also detected as a pressing force, leading to erroneous operation. On the other hand, the influence exerted by the temperature in each of the second and third embodiments does not cause occurrence of erroneous operation since there is no need to lower the threshold to a large extent, thereby enabling the embodiments to be put in practical use.

DESCRIPTION OF REFERENCE SYMBOLS

10: touch input device
20: touch detecting sensor
21: piezoelectric film
22, 23, 24: insulating film
30: holding member
40: housing
41: holding projection
50: fixing adhesive
221, 231: press detecting conductor
222, 242: position detecting conductor
251, 252, 253, 26: interlayer pressure-sensitive adhesive

The invention claimed is:

1. A press detecting device comprising:
   a housing;
   a press sensor having a piezoelectric film;
   a holding member;
   an interlayer pressure-sensitive adhesive that fixes the press sensor to the holding member, the interlayer pressure-sensitive adhesive having, relative to 20° C., a larger Young's modulus at temperatures below 20° C. and a smaller Young's modulus at temperatures above 20° C.; and
   a fixing adhesive that fixes the holding member to the housing, the fixing adhesive having, relative to 0° C., a larger Young's modulus at temperatures below 0° C. and a smaller Young's modulus at temperatures above 0° C.

2. The press detecting device according to claim 1, wherein
   the interlayer pressure-sensitive adhesive has a higher rate of change in Young's modulus with respect to temperature at temperatures below 20° C., and a lower rate of change in Young's modulus with respect to temperature at temperatures above 20° C., and
   the fixing adhesive has a lower rate of change in Young's modulus with respect to temperature at temperatures below 0° C., and a higher rate of change in Young's modulus with respect to temperature at temperatures above 0° C.

3. The press detecting device according to claim 2, wherein an output voltage ratio of the press detection device across a temperature range of −20° C. to 60° C. has an error range of ±30%.

4. The press detecting device according to claim 1, wherein the interlayer pressure-sensitive adhesive has a higher rate of change in Young's modulus with respect to temperature at temperatures below 20° C., and a lower rate of change in Young's modulus with respect to temperature at temperatures above 20° C.

5. The press detecting device according to claim 1, wherein the fixing adhesive has a lower rate of change in Young's modulus with respect to temperature at temperatures below 0° C., and a higher rate of change in Young's modulus with respect to temperature at temperatures above 0° C.

6. The press detecting device according to claim 1, wherein the housing defines an opening and the holding member is disposed in the opening.

7. The press detecting device according to claim 6, wherein the housing includes a holding projection that projects toward an inside of the opening, and an outer circumferential edge of the holding member is fixed to the holding projection by the fixing adhesive.

8. The press detecting device according to claim 7, wherein the press sensor is fixed to the holding member by the interlayer pressure-sensitive adhesive such that the press sensor is within the housing.

9. The press detecting device according to claim 1, wherein the piezoelectric film is formed of chiral polymer.

10. The press detecting device according to claim 9, wherein the chiral polymer is polylactic acid.

11. A press detecting device comprising:
    a housing;
    a press sensor having a piezoelectric film;
    a holding member;
    an interlayer pressure-sensitive adhesive that fixes the press sensor to the holding member, the interlayer pressure-sensitive adhesive having, relative to 20° C., a larger Young's modulus at temperatures below 20° C. and a smaller Young's modulus at temperatures above 20° C.; and
    a fixing adhesive that fixes the holding member to the housing, the fixing adhesive having, relative to 20° C., a larger Young's modulus at temperatures below 20° C. and a smaller Young's modulus at temperatures above 20° C.

12. The press detecting device according to claim 11, wherein
    the interlayer pressure-sensitive adhesive has a higher rate of change in Young's modulus with respect to temperature at temperatures below 20° C., and a lower rate of change in Young's modulus with respect to temperature at temperatures above 20° C., and
    the fixing adhesive has a higher rate of change in Young's modulus with respect to temperature at temperatures below 20° C., and a lower rate of change in Young's modulus with respect to temperature at temperatures above 20° C.

13. The press detecting device according to claim 12, wherein an output voltage ratio of the press detection device across a temperature range of −20° C. to 60° C. has an error range of +20% to −50%.

14. The press detecting device according to claim 11, wherein the interlayer pressure-sensitive adhesive has a higher rate of change in Young's modulus with respect to temperature at temperatures below 20° C., and a lower rate of change in Young's modulus with respect to temperature at temperatures above 20° C.

15. The press detecting device according to claim 11, wherein the fixing adhesive has a higher rate of change in Young's modulus with respect to temperature at temperatures below 20° C., and a lower rate of change in Young's modulus with respect to temperature at temperatures above 20° C.

16. The press detecting device according to claim 11, wherein the housing defines an opening and the holding member is disposed in the opening.

17. The press detecting device according to claim 16, wherein the housing includes a holding projection that projects toward an inside of the opening, and an outer circumferential edge of the holding member is fixed to the holding projection by the fixing adhesive.

18. The press detecting device according to claim 17, wherein the press sensor is fixed to the holding member by the interlayer pressure-sensitive adhesive such that the press sensor is within the housing.

19. The press detecting device according to claim 11, wherein the piezoelectric film is formed of chiral polymer.

20. The press detecting device according to claim 19, wherein the chiral polymer is polylactic acid.

* * * * *